(12) United States Patent
Martin et al.

(10) Patent No.: US 8,405,362 B2
(45) Date of Patent: Mar. 26, 2013

(54) METHOD AND SYSTEM FOR MINIMUM OUTPUT-VOLTAGE BATTERY CHARGER

(75) Inventors: Steven Leo Martin, Chelmsford, MA (US); David Justin Simmons, Waltham, MA (US)

(73) Assignee: Linear Technology Corporation CA (US)

( * ) Notice: Subject to any disclaimer, the term of this patent is extended or adjusted under 35 U.S.C. 154(b) by 706 days.

(21) Appl. No.: 12/631,564

(22) Filed: Dec. 4, 2009

(65) Prior Publication Data

US 2011/0133700 A1 Jun. 9, 2011

(51) Int. Cl.
*H02J 7/04* (2006.01)
*H02J 7/16* (2006.01)
*H02J 7/24* (2006.01)

(52) U.S. Cl. ........ 320/145; 320/132; 320/137; 320/152; 320/157; 320/159

(58) Field of Classification Search ............... 320/145
See application file for complete search history.

(56) References Cited

U.S. PATENT DOCUMENTS

| 5,986,437 | A | * | 11/1999 | Lee ............................. 320/162 |
| 7,489,109 | B1 | | 2/2009 | Qian et al. |
| 2006/0139002 | A1 | | 6/2006 | Zemke et al. |
| 2007/0029975 | A1 | * | 2/2007 | Martin et al. ................ 320/134 |

FOREIGN PATENT DOCUMENTS

EP 1 043 824 A2 10/2000

OTHER PUBLICATIONS

International Search Report issued in International Application No. PCT/US2010/058739 dated Jun. 26, 2012.
Written Opinion issued in PCT/US2010/058739 dated Jun. 26, 2012.

* cited by examiner

*Primary Examiner* — Edward Tso
*Assistant Examiner* — Ahmed Omar
(74) *Attorney, Agent, or Firm* — McDermott Will & Emery LLP

(57) ABSTRACT

An apparatus and method for a portable device incorporating a battery and a battery charger. In the portable device, there are a plurality of system components configured to facilitate a plurality of functions that the portable device is designed to perform. The battery in the portable device is configured for providing an internal power supply to the plurality of system components in the absence of an external input power supply. The battery charger is configured for charging the battery when the external input power supply is available. The battery charger disclosed herein is capable of supplying system power to the system components when voltage of the battery that is being charged is below a limit, thereby allowing the portable device to operate when voltage of the battery drops below the limit.

15 Claims, 10 Drawing Sheets

METHOD AND SYSTEM FOR MINIMUM OUTPUT-VOLTAGE BATTERY CHARGER

BACKGROUND

1. Technical Field

The present teaching relates to method and system for batteries. More specifically, the present teaching relates to method and system for a battery charger and systems incorporating the same.

2. Discussion of Technical Background

With the advancement of electronics, portable devices are ubiquitous. As commonly known, such portable devices usually operate on power provided by a battery. Much effort has been spent in prolonging the usage time of a battery. One phenomenon commonly encountered by users of a portable device is that when the battery voltage is below a minimum usable system level, even when the device is connected to an external power source, the "instant-on" function of the device is not possible. In those situations, a user of the device has to wait for the battery to charge to a minimum battery voltage before the device shows any response to the input power. This introduces much inconvenience and inefficiency.

FIG. 1 (PRIOR ART) depicts a conventional battery charger 100 to charge a battery 160. The conventional battery charger 100 comprises a duty cycle generator 130, an input current limit control system 110, a step-down switching regulator 120, a constant charge current amplifier 140, and a constant battery voltage amplifier 150. In this charger, the duty cycle generator 130 is controlled by the input current limit control system 110, the constant charge current amplifier 140, and the constant battery voltage amplifier 150. The duty cycle of the charger 100 controls the step-down switching regulator 120, which subsequently controls the system power to the portable device.

The duty cycle of the charger 100 is dynamically adjusted based on feedback information from multiple sources. For instance, the constant charge current amplifier 140 measures the current that flows through the battery 160 and attempts to control the duty cycle so that the current flowing through battery 160 remains constant. In addition, the constant battery voltage amplifier 150 measures the voltage of the battery 160 and uses such information to control the duty cycle so that the battery voltage remains constant. Furthermore, the input current limit control system 110 measures the input current and uses that information to automatically control the duty cycle generated by the duty cycle generator 130.

The term "lower deck" refers to a minimum voltage that a battery charger produces at its output when the battery is deeply discharged. In this illustrated battery charger, when the battery voltage is lower than the lower deck, there will be no system power sent to the portable device because all the power is channeled to the battery by the battery charger 100. Therefore, it has the problem discussed above with respect to the prior art solutions for battery chargers.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

In a portable device, when a user applies external power to the product, maintaining a minimum system voltage while the external power is available for charging the battery that is below the minimum useable system level, enables an "instant-on" operation. Simultaneously, providing an ideal diode function from the battery to the system load when the system load exceeds a programmed input power limit also benefits the system.

The present teaching relates to method and system by which a minimum output voltage of a battery charger is provided to power a system load even when the battery voltage is below that level. The present teaching also relates to method and system by which, when the input power to a portable device is limited, the battery's charge current can be sacrificed so that the system load power can be prioritized. The present teaching is further related to method and system wherein when the system load exceeds the power available, the battery charge current is reduced to zero and subsequently power may be pulled from the battery to support the system load. That is, when this situation occurs, the output voltage is no longer preserved at the minimum required system level but rather at or just below the battery level.

In this disclosure, the term "lower deck" refers to the minimum voltage that the battery charger produces at its output when the battery is deeply discharged. In addition, the terms "input power limit" and "input current limit" will be used interchangeably. Furthermore, since for a fixed input voltage the input power is constant, regulating only the input current is equivalent to regulating the input power.

Figure 1:
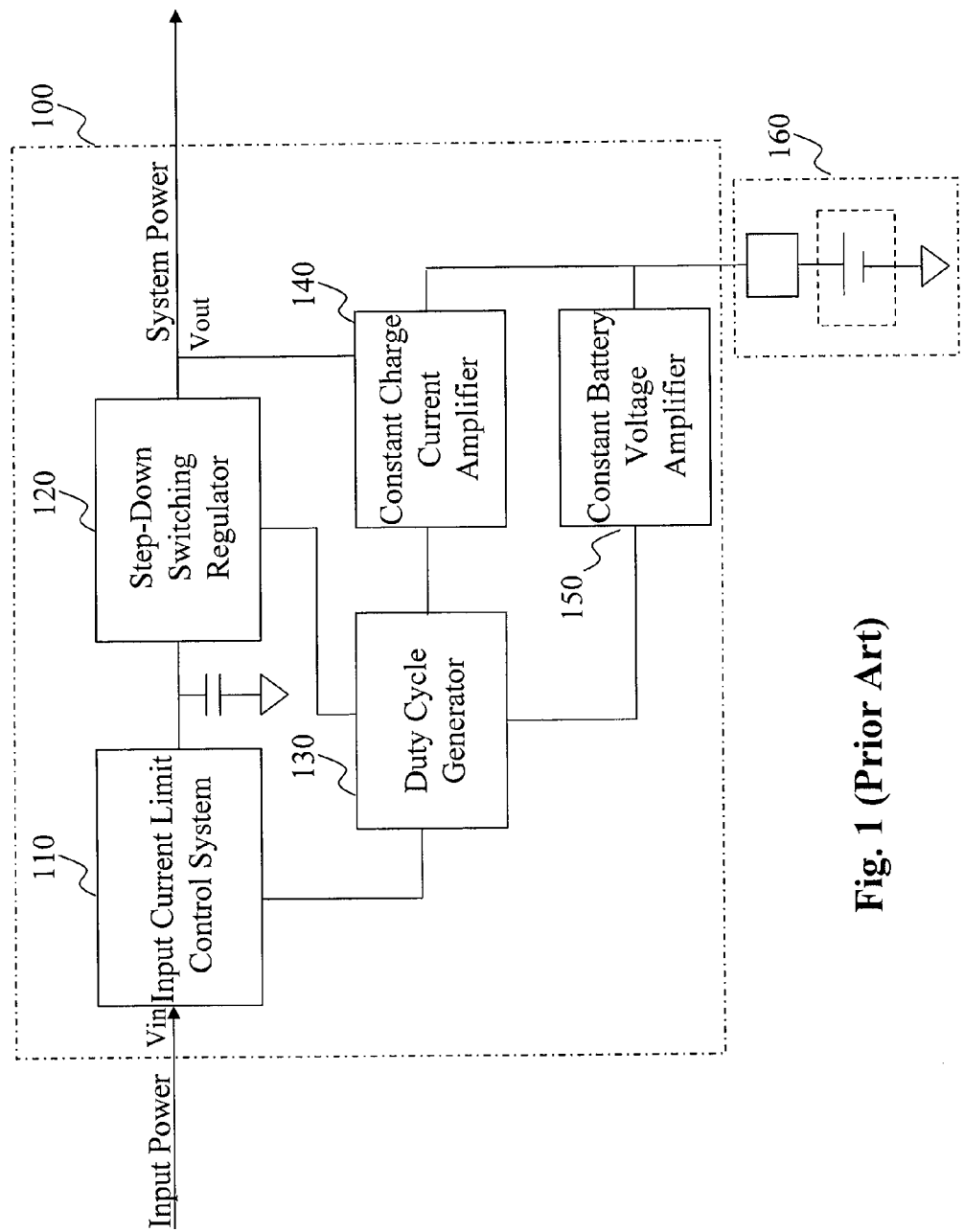
FIG. 1 (Prior Art) illustrates the system diagram of a conventional battery charger.
Figure 2:
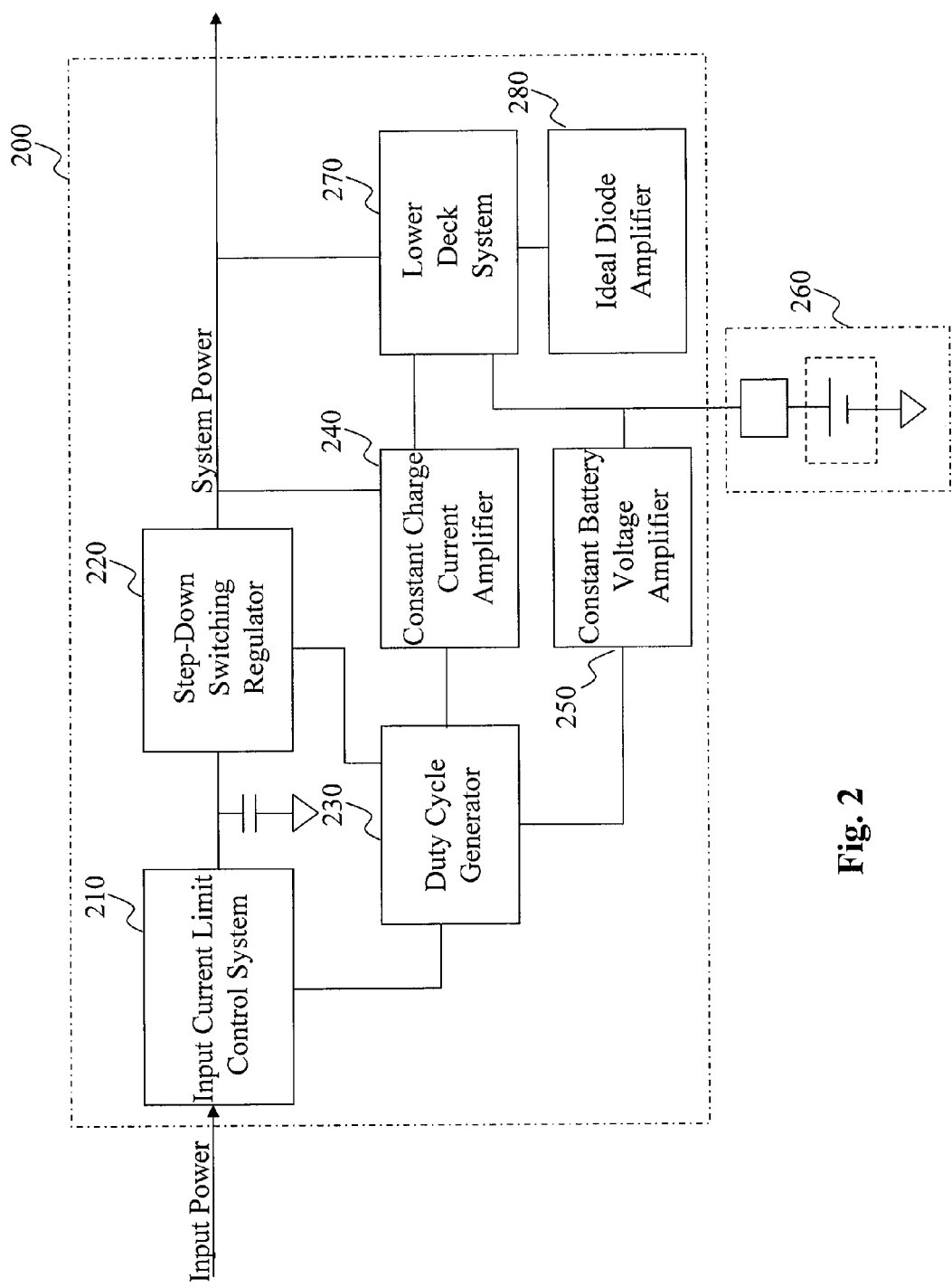
FIG. 2 depicts an exemplary system diagram including a battery and a battery charger, according to an embodiment of the present teaching.

FIG. 2 is a block diagram of an exemplary implementation 200 of a battery charger, according to an embodiment of the present teaching. In FIG. 2, the battery charger 200 is used to charge a battery 260. The battery charger 200 comprises a duty cycle generator 230 that controls a step-down switching regulator 220, various sub-circuitries that control the duty cycle generator 230, including an input current limit control system 210, a constant charge current amplifier 240, a constant battery voltage amplifier 250, and a lower deck system 270 as well as an ideal diode amplifier 280 used to control distribution of power between the battery and system load in different situations.

In the exemplary implementation 200, as can be seen, the duty cycle generator 230 is connected to the step-down switching regulator 220 power output. The duty cycle generated by the duty cycle generator 230 is controlled based on different conditions. As shown in FIG. 2, the duty cycle generator 230 is controlled by the input current limit control system 210 in accordance with the input current measured at the input of the battery charger 200, the constant charge current amplifier 240 based on the measured current that flows through the charger to the battery, and the constant battery voltage amplifier 250 based on the voltage measured on the battery 260.

Conventionally, the charge current flowing into the battery for re-charging is kept at a constant and that is achieved by the constant charge current amplifier 240. In addition, the battery voltage measured at battery 260 is also ensured to be at a certain level and this is achieved by the constant battery voltage amplifier 250. As will be discussed herein, the current flowing to the battery for recharging and the voltage measured at the battery may vary depending on the situation, according to the present teaching.

The lower deck system 270 observes the system load and the charging situation of the battery 260 and controls the distribution of power between the system power and the power to the battery for the re-charging. For example, when the battery voltage is lower than the lower deck and the system load needs power, the lower deck system 270 is designed to decouple the battery from the system power so that adequate amount of power is delivered to the portable device to allow its continued operation. The ideal diode amplifier 280 is used to re-couple the system power with the battery in certain situations. These will be discussed in detail below.

Figure 3:
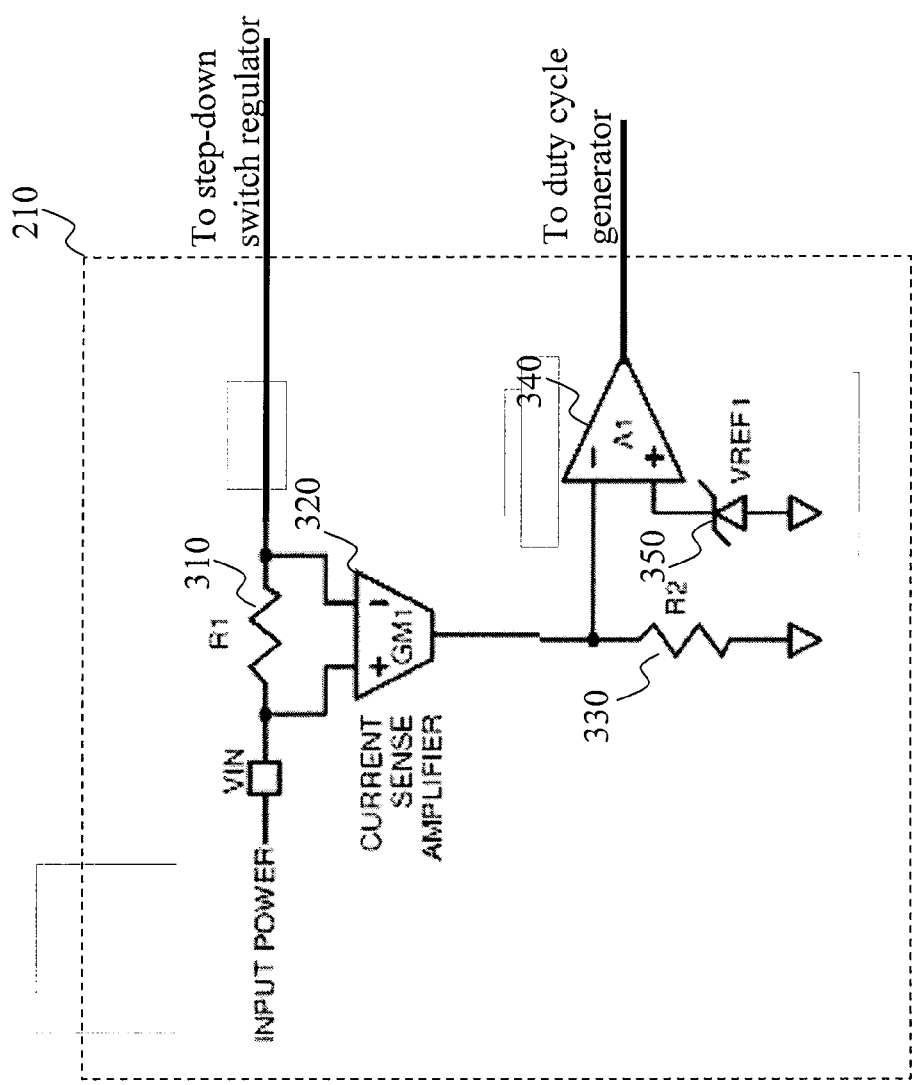
FIG. 3 depicts an exemplary circuit for an input current limit control system, according to an embodiment of the present teaching.

FIGS. 3-8 depict exemplary implementations of different system components as illustrated in FIG. 2, according to an embodiment of the present teaching. The functionalities of the circuitry will be discussed in detail after exemplary embodiments of those system components are disclosed. FIG. 3 depicts an exemplary circuit for the input current limit control system 210. As disclosed herein, the input current limit control system 210 is connected to both the duty cycle generator 230 and the step-down switching regulator 220. As shown in FIG. 3, the input current limit control system 210 comprises two resistors R1 310 and R2 330, a current sensing amplifier 320, and a reference voltage 350, and an amplifier A1 340. These components are connected as shown in FIG. 3. The output of the amplifier A1 340 is connected to the duty cycle generator 230. One terminal of resistor R1 is connected to the input power and the other terminal of R1 is connected to the step-down switching regulator 220.

Figure 4:
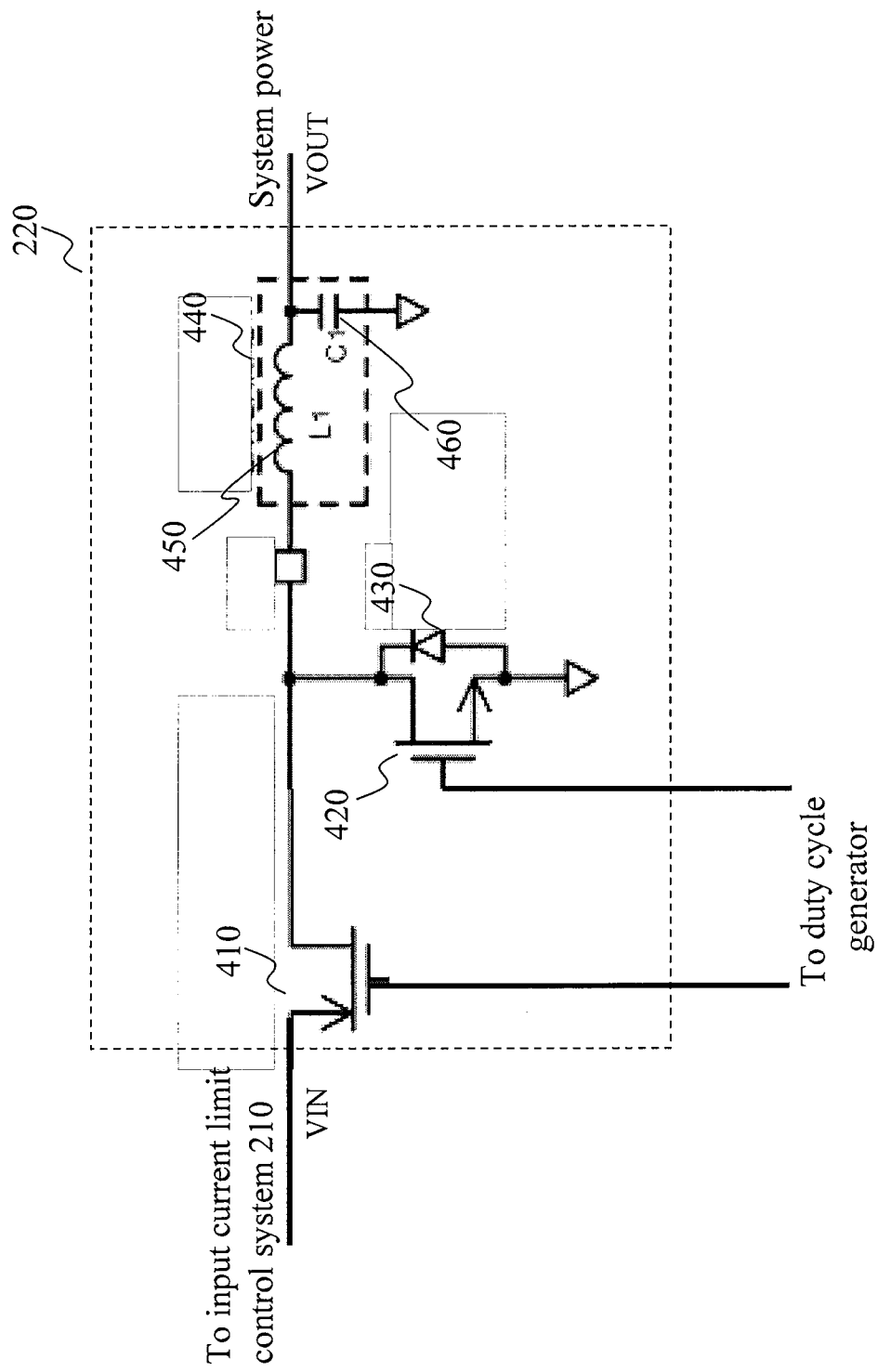
FIG. 4 depicts an exemplary circuit for a step-down switching regulator, according to an embodiment of the present teaching.

FIG. 4 depicts an exemplary implementation of the step-down switching regulator, according to an embodiment of the present teaching. The exemplary step-down switching regulator 220 comprises PMOS transistor 410 and NMOS transistor 420, a diode 430 connecting the source and drain of transistor 420, and a sub-circuit 440 including an inductor L1 450 and a capacitor C1 460 connected as shown in FIG. 4. The PMOS transistor serves as a power switch. The NMOS transistor 420 serves as a synchronous rectifier. In some embodiments, the sub-circuit 440 may be external with an inductor and capacitor L1 and C1, respectively. The step-down switching regulator connects between input power VIN to output power VOUT.

The gates of both transistors 410 and 420 are connected to the duty cycle generator 230. The source of transistor 410 is connected to the input current limit control system 210. The drain of transistor 410 is connected to the drain of transistor 420 and the source of transistor 420 is connected to the ground. The sub-circuit 440 is coupled to the drain of transistors 420 and 410 and its output is connected to the system power. In some embodiments, when the duty cycle changes, the step-down switching regulator 220 may need to have accordingly a different implementation, which may contain both internal as well as, what are typically, external components used to realize a switching battery charger.

Figure 5:
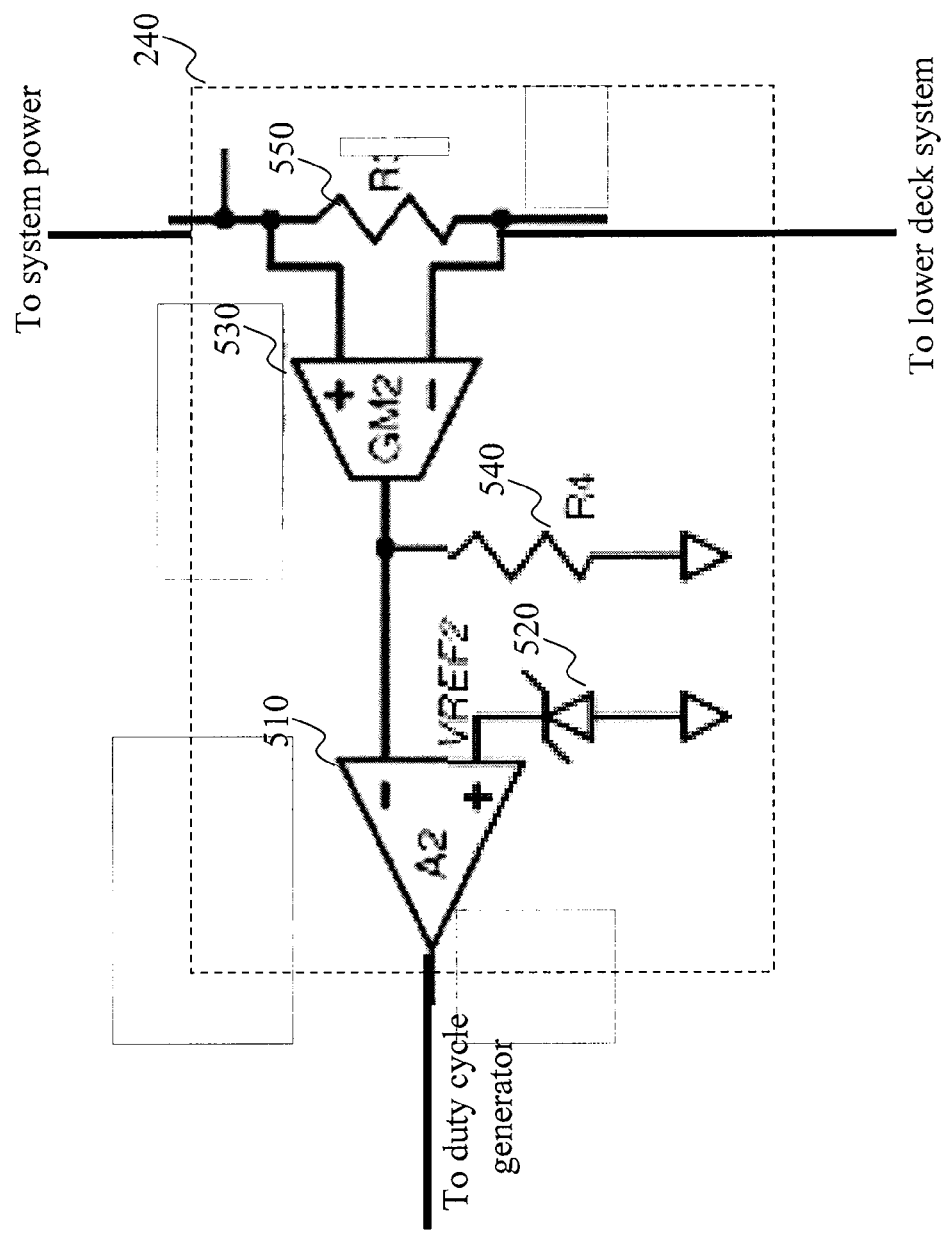
FIG. 5 depicts an exemplary circuit for a constant charge current amplifier, according to an embodiment of the present teaching.

FIG. 5 depicts an exemplary implementation of the constant charge current amplifier 240, according to an embodiment of the present teaching. The exemplary constant charge current amplifier 240 comprises a current sense amplifier 530, a resistor R4 540, an amplifier 510, and a reference voltage 520. The current sense amplifier 530 has two input terminals. The non-inverting input terminal is connected to the system power and the inverting input terminal is connected to the lower deck system 270. In between the positive and negative input terminals, a resistor R3 550 is present. Across the resistor R3, the current sense amplifier 240 senses the current flowing to the lower deck system 270.

Once it senses the current flowing to the lower deck system 270, the current sense amplifier 530 generates an output and this output is sent to the inverting input terminal of the amplifier 510. The amplifier 510 works in accordance with the difference between the signal received from the current sense amplifier 530 on its inverting input terminal and a reference provided on its positive terminal via reference voltage 520, which is connected to the non-inverting terminal of the amplifier 510 and the ground. Resistor R4 540 is connected between the output of the current sense amplifier 530 and the ground. The output of the amplifier 510 is sent to the duty cycle generator 230 to control the duty cycle in accordance with the sensed current flowing from the system power to the lower deck system 270.

Figure 6:
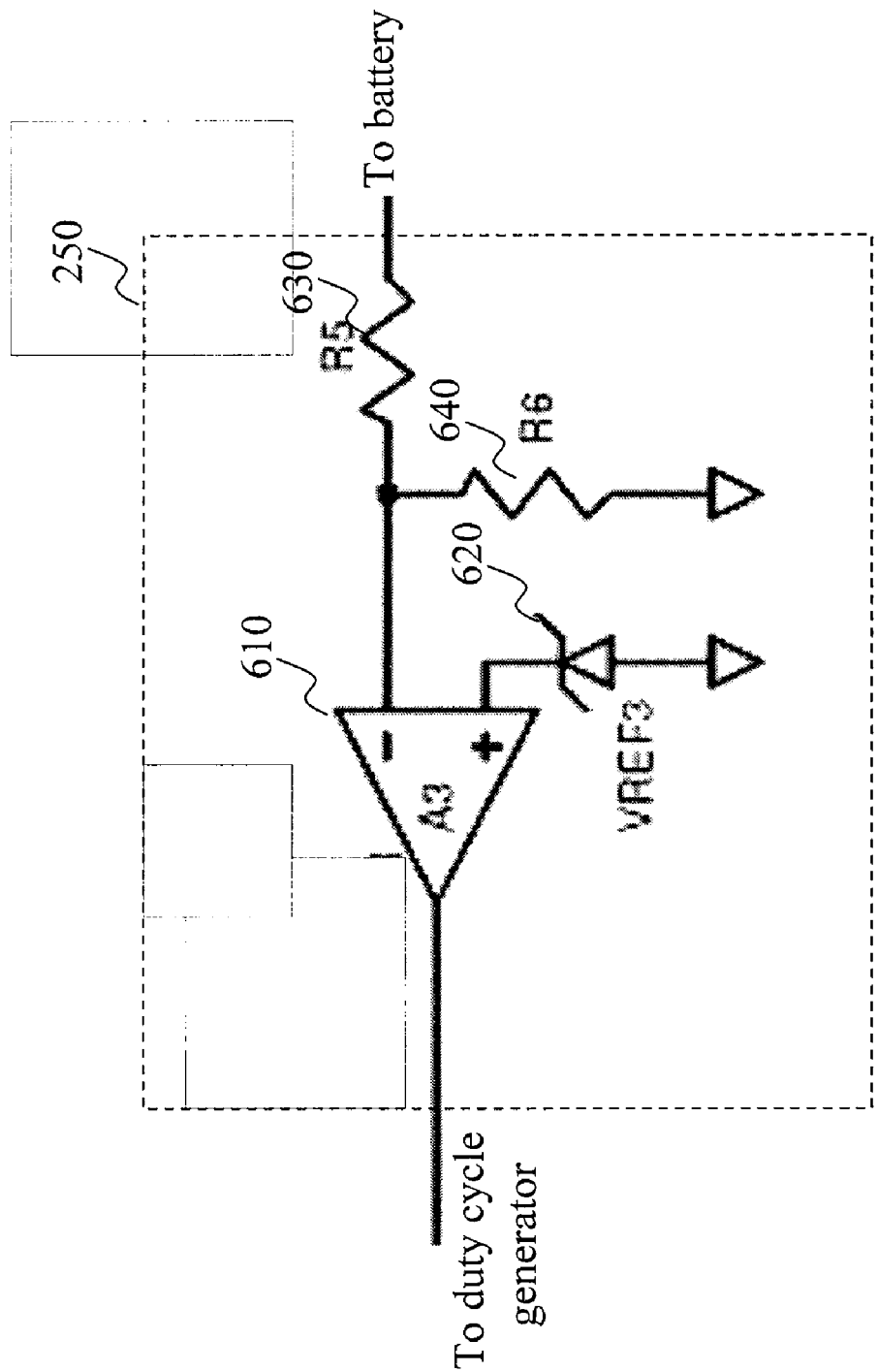
FIG. 6 depicts an exemplary circuit for a constant battery voltage amplifier, according to an embodiment of the present teaching.

FIG. 6 depicts an exemplary implementation of the constant battery voltage amplifier 250, according to an embodiment of the present teaching. The exemplary constant battery voltage amplifier 250 connects, at its input, to the battery 260 and, at its output, to the duty cycle generator 230. Internally, the constant battery voltage amplifier 250 comprises two resistors, R5 630 and R6 640, a reference voltage 620, and an amplifier 610. One terminal of resistor R5 630 is coupled to the battery and the other is connected to the inverting input terminal of the amplifier 610. Resistor R6 640 is connected between the inverting input terminal of the amplifier 610 and the ground. The reference voltage 620 is connected between the ground and the non-inverting input terminal of the amplifier 610 to provide a reference voltage. The amplifier 610 operates based on the difference between the reference voltage provided at its non-inverting input terminal and the voltage sensed on the battery and provided to it on its non-inverting input terminal. The output of the amplifier A3 610 is sent to the duty cycle generator 230.

Figure 7:
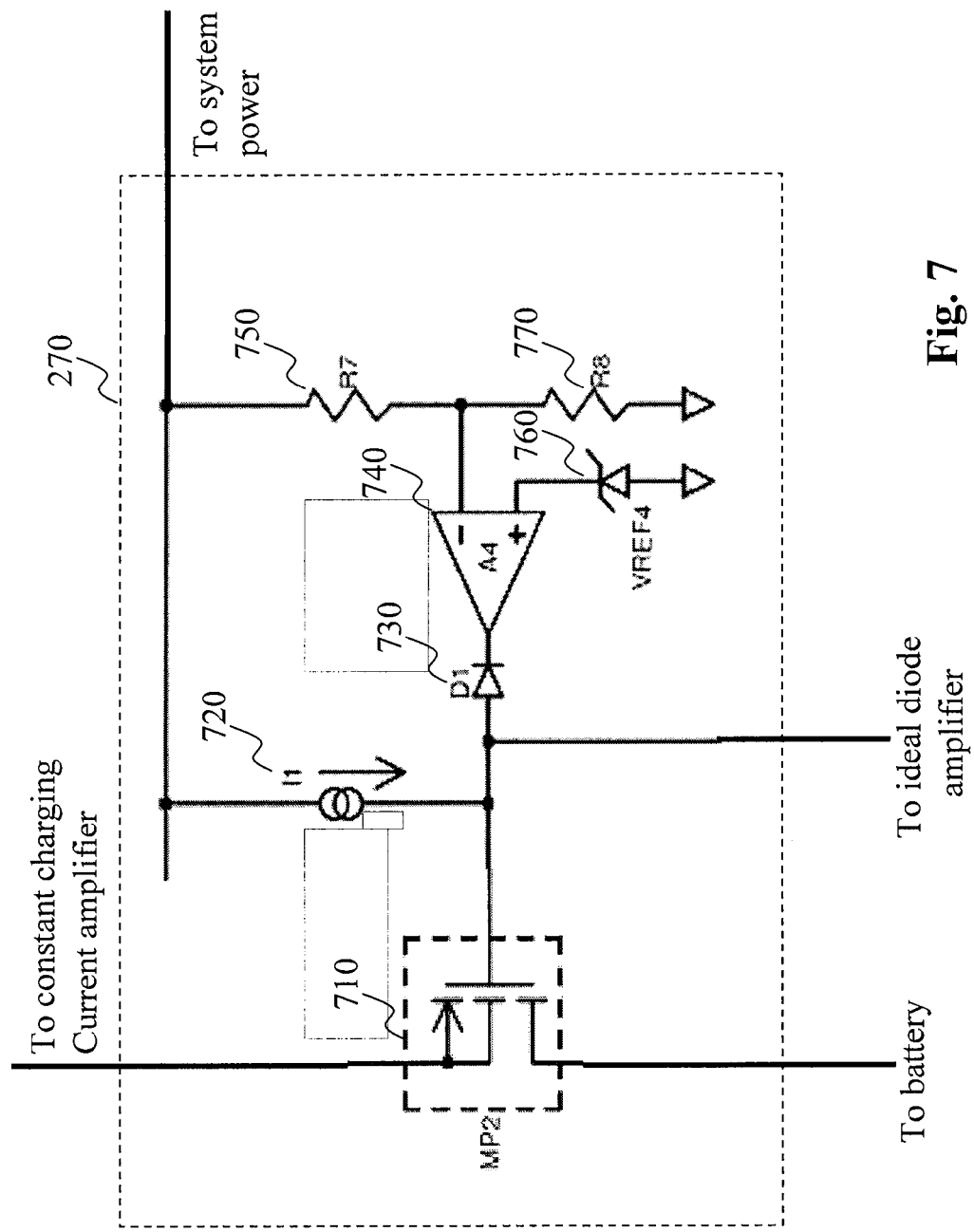
FIG. 7 depicts an exemplary circuit for a lower deck system, according to an embodiment of the present teaching.

FIG. 7 depicts an exemplary implementation of the lower deck system 270, according to an embodiment of the present teaching. The exemplary lower deck system 270 comprises a PMOS transistor 710, a current source 720, a diode 730, an amplifier 740, a voltage reference 760, and two resistors R7 750 and R8 770. They are connected as follows. The source of the PMOS transistor 710 is connected to the constant charging current amplifier 240. The drain of the PMOS transistor 710 is connected to the battery. The current source 720 is connected between the system power and the gate of the PMOS transistor 710, which is also connected to the ideal diode amplifier 280. The anode of diode 730 is connected to the gate of transistor 710 and the cathode of diode 730 is connected to the output of the amplifier 740. The voltage reference VREF4 760 is provided at the non-inverting input terminal of the amplifier. Two resistors, R7 750 and R8 770, are connected in series between the system power and the ground. The inverting input terminal of the amplifier 740 is connected to where resistors 750 and 770 are connected to each other.

Figure 8:
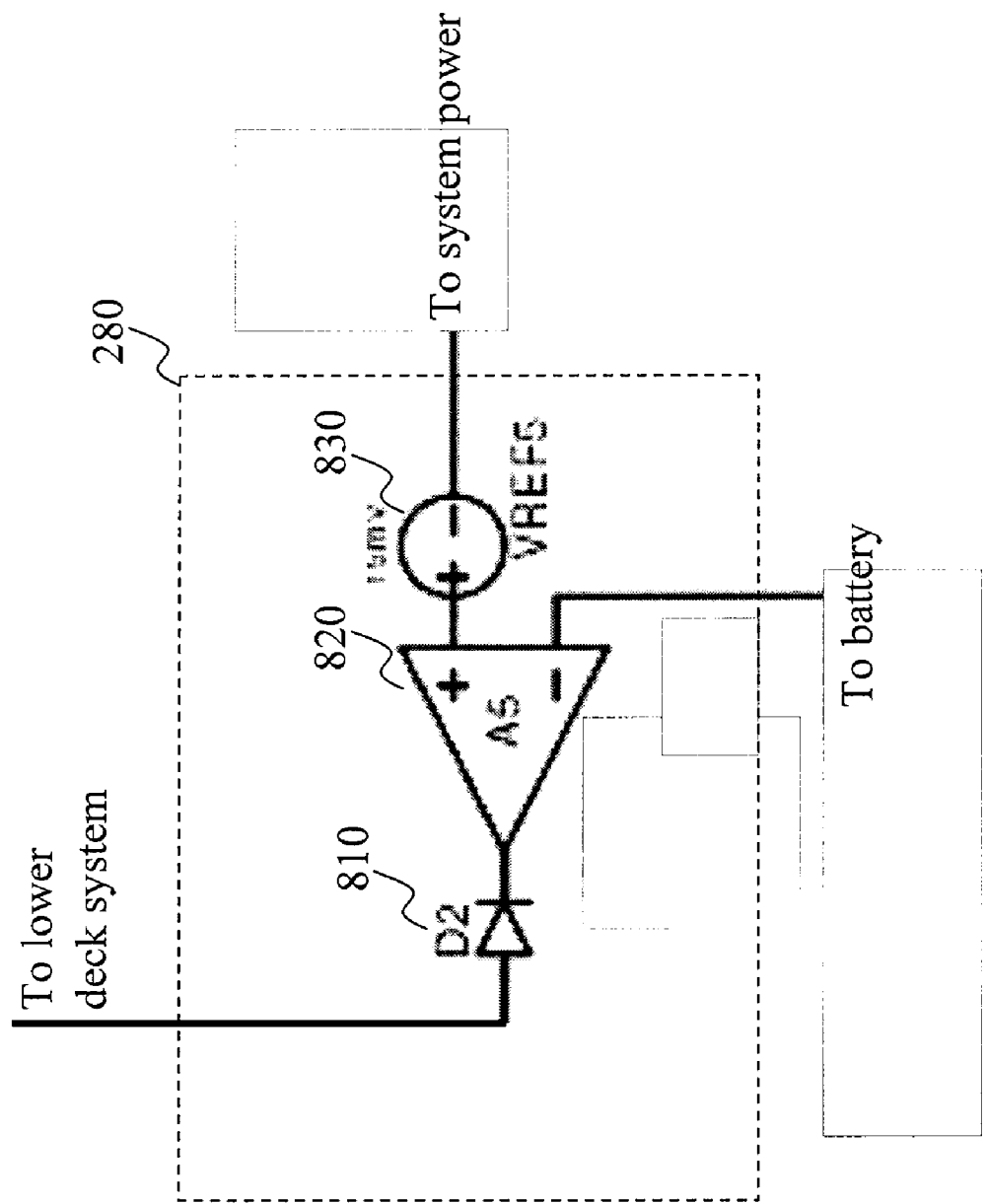
FIG. 8 depicts an exemplary circuit for an ideal diode amplifier, according to an embodiment of the present teaching.

FIG. 8 depicts an exemplary implementation of the ideal diode amplifier 280, according to an embodiment of the present teaching. The exemplary ideal diode amplifier 280 comprises an amplifier 820 and a diode 810 coupled to the amplifier. The non-inverting input terminal of the amplifier 820 is connected to a voltage reference 830 which is connected to the system power. The inverting input terminal of the amplifier is connected to the battery 260. The anode of the diode 810 is connected to the gate of the PMOS transistor 710 in the lower deck system 270 and the cathode of diode 810 is connected to the output of the amplifier 820.

Figure 9:
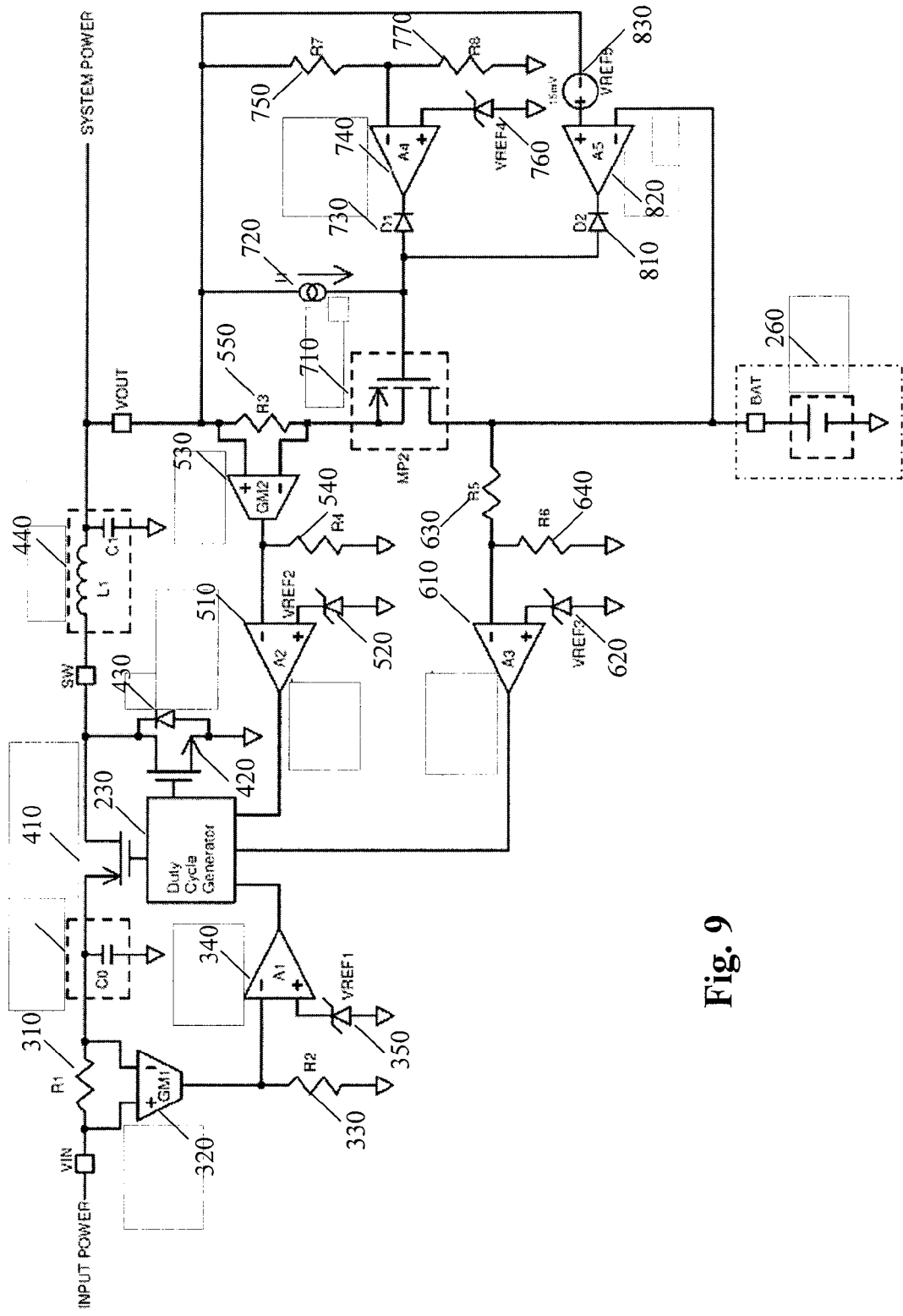
FIG. 9 depicts an exemplary implementation for a battery charger, according to an embodiment of the present teaching.

FIG. 9 depicts the overall exemplary implementation of the battery charger 200 based on the exemplary circuitry implementations presented in FIGS. 3-8, according to an embodiment of the present teaching. In operation, the amplifier 610 (A3), along with resistors R5 630 and R6 640 in the constant battery voltage amplifier 250, detects the difference between the battery voltage and reference source VREF3 (620) and develops an error signal. This error signal is used to control the constant voltage part of the constant current/constant voltage algorithm (now shown) typically used to charge a Lithium Ion battery.

The key of the present teaching relates to how the lower deck system 270 and the ideal diode amplifier 280 operate in conjunction with other parts of the circuit. In general, the float voltage control level controlled by the amplifier 610 is expected to be significantly above the lower deck level. Given that, the float voltage amplifier 610 in the constant battery voltage amplifier 250 and the amplifier 740 in the lower deck system 270 are expected to interact independently with the constant charge current amplifier 240, but not with each other. As amplifier 610 is not expected to operate contemporaneously with the lower deck system 270, details of its operation are not discussed herein.

In the constant charging current amplifier 240, amplifier A2 or 510, in conjunction with the current sense transconductance amplifier GM2 or 530, resistors R3 550 and R4 540, as well as reference source VREF2, develops an error signal which is used to control the constant current part of the constant current/constant voltage algorithm, typically used to charge a Lithium Ion battery. Use of such amplifiers and circuitry to convert their output to an appropriate switch duty cycle, is well known to those skilled in the art of switching power supply design. The constant current/constant voltage algorithm is also well known to those skilled in the art of linear Li-Ion battery charger design.

In the input current limit control system 210, the current sense amplifier GM1 320, amplifier A1 340, resistors R1 310 and R2 330, and reference source VREF1 enable the switching regulator 220 to measure and control its own average input current. This feature is not a necessary requirement for a battery charger but may be useful for compliance with certain industry standards such as the USB standard. This capability offers additional utility with respect to a battery charger in the following sense. First, it may allow the regulator to deliver constant output power rather than output current. Second, it may be useful to control the current drawn from a current limited source. The former is useful because it optimizes charging power from a limited power source and therefore also optimizes the charging time. The latter is useful for minimizing design requirements on the input source thereby reducing its size and cost.

It is well known in the art that various control amplifiers can be coupled to the power switches in a first limiter configuration (not shown). That is, a switching regulator is programmed to deliver maximum power in the absence of any control signals. Regulation is achieved when at least one of the various control amplifiers reaches its regulation point and instructs the regulator to limit output power. When a step-down switching regulator is used, as shown in FIGS. 2 and 4, this results in a reduction of duty cycle. As will be seen, the input current regulation feature will, when used with the minimum output voltage (i.e. lower deck) regulation amplifier (the lower deck system 270 in FIG. 2), produce an interesting and useful set of behaviors.

It should be noted that the illustrated exemplary implementation of the input current measurement system in 210 is not the only possible embodiment. Alternative embodiments are also possible to achieve the same goal. For example, one possible alternative implementation is to use a power switch (e.g., transistor 410 in FIG. 4) as the current sensing element.

An important element of the present teaching is the lower deck system 270, which, as discussed herein, includes an amplifier A4 740, transistor MP2 710, resistors R7 750, R8 770, reference voltage VREF4 760, a current source I1 720, and diode D1 730. The lower deck system 270 operates in conjunction with the input current limit system 210. In operation, the function of transistor MP2 710 is to connect, with as low an impedance as possible, the output of the switching regulator to the battery terminal. This low-impedance connection ensures optimum battery charging efficiency. This generally puts the switching regulator's output voltage at, or slightly above, the battery terminal voltage. However, when the battery voltage is below the level at which the portable product can reliably operate (i.e. the lower deck), the transistor MP2 710 is designed to decouple the battery terminal and switching regulator output to preserve output voltage.

The amplifier A4 740 in the lower deck system 270, in conjunction with resistors 750 and 770, VREF4, current source I1 720, and diode D1 730, controls the gate of transistor MP2 710 so that when the system voltage, VOUT, falls to the lower deck voltage, transistor MP2's impedance increases. This increased impedance affects the decoupling required to have a battery terminal at one voltage and an output voltage at a different, and preferably higher, voltage.

The functionalities that the battery charger 200 performs in operation can be discussed in accordance with different scenarios. To properly disclose such functionalities, the following scenarios are considered.

1. Battery voltage above lower deck, system load plus programmed charge current does not exceed input power limit.
2. Battery voltage above lower deck, system load plus programmed charge current does exceed input power limit. Neither system load nor charge current alone exceed input power limit.
3. Battery voltage above lower deck, system load alone exceeds input power limit.
4. Battery voltage above lower deck, programmed charge current alone exceeds input power limit.
5. Battery voltage above lower deck. Both the system load and programmed charge current alone exceed input power limit.

6. Battery voltage below lower deck, system load plus programmed charge current does not exceed input power limit.
7. Battery voltage below lower deck, system load plus programmed charge current does exceed input power limit. Neither system load nor charge current alone exceed input power limit.
8. Battery voltage below lower deck, system load alone exceeds input power limit.
9. Battery voltage below lower deck, programmed charge current alone exceeds input power limit.
10. Battery voltage below lower deck. Both the system load and programmed charge current alone exceed input power limit.

The operations of the battery charger will be discussed with respect to each of the listed scenarios in detail below.

Scenario 1:

In this scenario, the battery voltage is above the lower deck voltage and the combination of the battery charge current and system load does not exceed the programmed level of the input current limiting feature. In this case the lower deck amplifier pulls the gate of transistor MP2 (710) as low as possible (e.g., preferably to ground), making transistor MP2 as conductive as possible. The output voltage VOUT of the switching regulator equals the battery voltage plus the charge current times the total resistance of transistor MP2 and resistor R3 (550).

In this scenario, the amplifier A2 (510) in the constant charge current amplifier 240, which is tasked to regulate the charge current, is in control of the switching regulator's duty cycle. The battery receives the charge current for which it was programmed. When the load current fluctuates, the output voltage will also fluctuate causing more or less charge current to flow. In this case, amplifier A2 (510) will detect the fluctuation in charge current to the battery and readjust the duty cycle of the switching regulator 220 to compensate. In this case, no other amplifiers exercise any influence over the switching regulator 220.

Scenario 2:

In this scenario, the battery voltage is above the lower deck voltage and the combined load current and programmed charge current exceeds the input power limit programming level but neither alone would. In this case, the gate of transistor MP2 710 is still near ground because amplifier A4 (740) does not detect an output voltage that is below the lower deck level. In this case, the amplifier A1 340 in the input current limit control system 210 is in control of the switching regulator's duty cycle and, hence, its output power. Since the battery voltage is fixed, the output voltage in this case will fall slightly, leaving less than enough voltage across the combined resistance from transistor MP2 and resistor R3 to support the programmed charge current. However, the full load current will continue to be supplied to VOUT because the direct connection between the load and the inductor gives it a top priority. In addition, in this situation, amplifier A2 510 will be strongly dissatisfied thereby relinquishing control of the switching regulator. Therefore, as the battery charger 200 is designed, the charge current is in this case sacrificed to yield to the higher priority of the load current.

Scenario 3:

In this scenario, the battery voltage is above the lower deck level and the system load alone exceeds the input power limit. As in scenario 2, in this case, the input current limit control system 210 controls the duty cycle of the switching regulator 220. The gate of transistor MP2 710 in the lower deck system 270 will be near ground. Since the external load exceeds the power allocated, the output voltage VOUT will be pulled down and the voltage across transistor MP2 and resistor R3 will reverse. This voltage reversal results in current being drawn from the battery rather than being delivered to it. Thus, by the nature of the connections to the load and the battery and the non-zero impedances of transistor MP2 710 and resistor R3 550, an automatic ideal diode function is realized where the power is delivered to the output from both the input supply and the battery 260. Other than by virtue of the invention's topology, this result is achieved without any additional decision making components.

This can be considered to be an inherent zero forward-voltage ideal diode because it does not have a specific threshold voltage detection level but rather relies on the natural behavior of the resistive elements. In addition, it is noted that in combining scenarios 1, 2 and 3, as the combined load current and charge current increases beyond the input power limit, the charge current tapers from full, to partial, to zero, and finally then negative to supplement load current. Each of scenarios 1, 2, and 3 produces the desired behavior so that the output voltage goes from slightly above the battery voltage to slightly below the battery voltage.

Scenario 4:

In scenario 4, the programmed charge current alone exceeds the input power limit programming. This is another special case of scenario 2 where the charge current will automatically be reduced to the level dictated by the input current limit control system 210. In this case, the gate of transistor MP2 710 is at ground and the output voltage VOUT is the battery voltage plus the available charge current times the combined resistance of transistor MP2 710 and resistor R3 550.

Scenario 5:

In this scenario, both the system load current and the programmed battery charge current alone exceed the input power limit and therefore so does their sum. As in scenario 2, the input current limit control system 210 is in control of the duty cycle of the switching regulator and the gate of transistor MP2 710 is at ground. Similar to scenario 3, the output voltage in this case will be pulled by the system load below the battery terminal voltage and supplemental power will be supplied to the load from the battery. The fact that the programmed charge current also exceeds the input power limit is inconsequential because the reversed voltage on the MP2-R3 combination makes the charge current control system strongly dissatisfied and therefore impotent.

Scenario 6:

Scenario 6 is the first scenario wherein the battery voltage is below the lower deck level. In this case, the discussion focuses on what occurs when the combined load current and the programmed charge current do not exceed the threshold used by the input power limit control system 210.

When the battery voltage is below the lower deck level, amplifier A4 740 in the lower deck system 270 allows I1 to pull up on the gate of transistor MP2 710, causing its impedance to rise so that the output VOUT does not fall below the programmed lower deck level. That is, the impedance between the battery 260 and output voltage VOUT is intentionally increased via MP2 and amplifier A4 740 in order to decouple the battery terminal from the output node. As stated previously, this decoupling is necessary to preserve the output voltage in case of a low battery voltage.

In this scenario, as in scenario 1, amplifier A2 510 in the battery charge current control amplifier 240, is in control of the duty cycle of the switching regulator 220. Unlike in scenario 1, amplifier A4 740 in the lower deck system 270 is no longer trying to ground the gate of transistor MP2 710 but rather is regulating it at the level required to preserve the output voltage.

Some interesting observations can be made in this scenario. First, the components in the lower deck system 270, including amplifier A4 740, transistor MP2 710, resistors R7 750 and R8 770, and VREF4 have no direct influence on the duty cycle of the switching regulator 220. That is, this is a completely independent circuit.

Second, these components in the lower deck system 270 bear a strong resemblance to a shunt regulator. Specifically, when current is supplied to the top of the lower deck system 270, the voltage is regulated fairly precisely by the modulated MP2 impedance which is controlled by the high gain of amplifier A4 740. The major difference between this network and a shunt regulator is that in a shunt regulator the current is generally sent to ground (i.e. wasted) but in this network it is sent to the battery and therefore facilitates useful functionalities.

Third, there is a charge current control loop in the battery charger shown in FIGS. 2 and 9. Specifically, resistors R3 550 and R4 540, GM2 530 and amplifier A2 510, still "see" a low-impedance load. That is, rather than sending a fixed current to the battery through low impedances of resistor R3 550 and transistor MP2 710 as before, it now sends its current to the "shunt regulator" formed by the transconductance of transistor MP2 710 that is backed up by the high gain of amplifier A4 740. So, in this case, the shunt regulator now acts as a surrogate for the battery: making a new low impedance load that behaves like the low impedance battery but with a higher terminal voltage.

Scenario 7:

As in scenario 2, the combined system load and programmed charge current exceeds the input power limit whereas neither alone would. In this case, amplifier A1 340 in the input current limit control system 210 is in control of the power level from the switching regulator 220. However, in this scenario, the battery 260 is below the lower deck level. As in scenario 6, the lower deck control system now regulates the gate of transistor MP2 710 in order to preserve the output voltage VOUT. The difference between scenario 7 and scenario 6 is that since there is insufficient power supply for the combined load and, thus, the charge current, the output voltage will fall slightly lower than it does in scenario 6, which causes amplifier A4 740 to allow I1 to pull up the gate of transistor MP2 710, thereby increasing MP2's impedance further. This increase in impedance of transistor MP2 710 will then effectively decrease the battery charge current until the system load is satisfied.

Scenario 8:

In scenario 8, the system load alone exceeds the input power limit. In this case, it is impossible for the switching regulator 220 to maintain any output voltage without violating or somehow otherwise defeating the input current limit control. Therefore, the output voltage will fall below the lower deck level. In general, this scenario represents a failure of the portable product from a system architecture standpoint because it represents a situation in which the input power source, and subsequently the programming level of the input power limit control system, was insufficiently designed to provide the minimum requisite power to the product. According to the present teaching, an explicit ideal diode function is disclosed that attempts to reverse the decision of the lower deck system 270 and re-couple the battery and output voltage to provide emergency power to the system load.

Note that since the battery is now below the lower deck level, the attempt to deliver battery power may or may not be successful as the portable system may detect the reduced voltage and enact a system reset or otherwise be dysfunctional. Also note that the battery, in its reduced charge state, may or may not be able to supply the demanded current without a further precipitous drop in the cell voltage. The ideal diode function may nonetheless be included in commercially available products so that a system is able to operate just below the lower deck level when the battery has not been discharged so far that further loading it would cause harm.

The ideal diode function is achieved by the ideal diode amplifier 280. As illustrated in FIG. 8, the ideal diode amplifier 280 may include amplifier A5 820 and a reference voltage VREF5 830. As the output voltage falls more than a certain amount, e.g., 15 mV, below the battery voltage, amplifier A5 820 pulls the gate of transistor MP2 710 back toward ground, thereby reconnecting the battery and the output voltage. Amplifier A4 740 in the lower deck system 270 in this situation does not interfere with this operation for a number of reasons. Due to the diode ORing function of diodes D1 730 in the lower deck system 270 and D2 810 in the ideal diode amplifier 280, there will be no interference. In addition, since transistor amplifier A4 is already in a state that it is strongly dissatisfied, its output voltage is a high level. Similarly, in previous scenarios, amplifier A5 820 does not interfere with amplifier A4 740 due to the fact that when the lower deck function was active, VOUT is always above the voltage of the battery and, thus, making amplifier A5 820 always strongly dissatisfied.

Scenario 9:

In scenario 9, the battery voltage is below the lower deck level and the programmed charge current alone exceeds the input power limit. In this case, as in scenario 4, the input current limit control system 210 will be in control of the duty cycle of the switching regulator 220. Since this loop will be trying to reduce the duty cycle in order to maintain a maximum input current, the output voltage may fall slightly. As the output voltage falls, the lower deck amplifier A4 740, may again allow I1 to raise the gate of transistor MP2 710, causing transistor MP2 to become less conductive. Eventually the gate of transistor MP2 710 and, accordingly, the impedance of transistor MP2 710, may rise high enough to reduce the battery charge current to a level permitted by the input current limit control system 210. This results in a charge current below the programmed limit and output voltage equal to the lower deck level. Because the charge current is now below the programmed level, the constant charge current control amplifier 240 is accordingly strongly dissatisfied and therefore will not interfere with the input current limit control system 210.

Scenario 10:

In scenario 10, both the programmed battery charge current and the system load current alone exceed the input current system's limit. This case is very similar to scenario 8 where the load current pulls the output voltage below the lower deck level, thereby requiring the explicit ideal diode function to re-couple, via transistor MP2 710, the battery terminal to the system output node VOUT. This scenario also signifies somewhat the failure in the system design because the lower deck limit has been breached and correct operation of the product may be compromised depending on the actual battery cell voltage.

There are some practical issues. In scenarios 6-10, amplifier A4 740 in the lower deck system 270 is active and transistor MP2 710 presents a resistance higher than its minimum achievable value. When this is the case, the voltage across MP2 is no longer minimized (i.e. it is now equal to the lower deck voltage minus the battery voltage) and therefore its power dissipation is no longer minimized. For a high power system, it is obvious that the power dissipation can become substantial. This may have some adverse effects. For example, the battery charger 200 is now a hybrid of a switching battery charger and a linear battery charger and therefore has hybrid efficiency. That is, its efficiency will be lower than the maximum achievable for the given conditions. In addition, the decoupling transistor MP2 710 needs to be designed to withstand the power dissipation that occurs until the battery terminal voltage reaches the lower deck level. They are trade-offs that are, without the use of a second DC/DC converter, present in providing the instant-on feature within a portable product. In some embodiments, an alternative method or circuitry may be employed to protect transistor MP2 710, which reduces the programmed charge current from a higher value to a lower value as a function of the difference between the lower deck voltage and the battery terminal voltage. As a trade-off, this alternative approach may increase the charge time.

In some embodiments, various considerations may be taken into account in order to mitigate these adverse effects. For example, the lower deck voltage can be set as low as possible thereby nudging the hybrid battery charger more towards a purely switching charger while still providing the feature of the instant-on behavior. Generally the lower deck voltage is determined based on the level at which a portable device can reliably work. In addition, since when the battery voltage is very low, it generally charges to the lower deck voltage fairly quickly, the fraction of time during which the charger is in this inefficient mode is rather short. Thus the total charging efficiency over a charge cycle is still very high. Furthermore, the additional power dissipation in the pass element (e.g., transistor MP2 710) may not be prohibitive if the duration is not expected to be very long.

Figure 10:
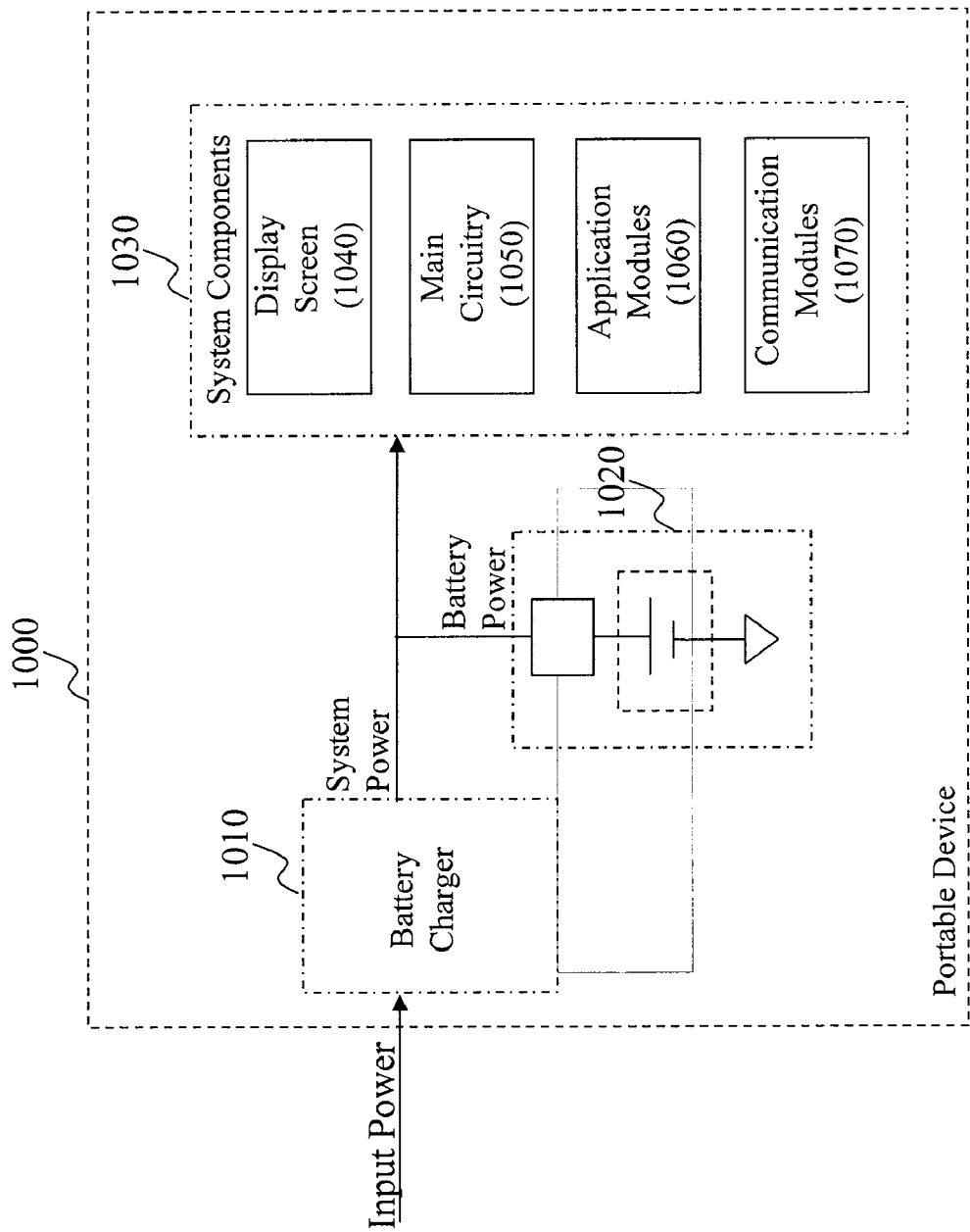
FIG. 10 shows a portable device that incorporates a battery charger capable of allowing the portable device to operate when the battery voltage drops below the lower deck, according to an embodiment of the present teaching.

FIG. 10 shows a portable device 1000 that incorporates a battery charger 1010 capable of allowing the portable device to operate when the battery voltage drops below lower deck, according to an embodiment of the present teaching. In this configuration, the portable device 1000 includes a battery 1020, a battery charger 1010, and a set of system components 1030 deployed in order for the portable device to perform the functions it is designed to perform. Examples of such system components include some display screen 1040, main circuitries 1050 that allow a plurality of application modules 1060 and communication modules 1070 to operate.

In operation, when the portable device 1000 is not connected to any external power supply, i.e., there is no input power to the battery charger, battery 1020 provides the system components with internal power supply. When battery 1020 is discharged and there is an external power supply, the battery charger 1010 charges the battery. When the battery is deeply discharged, i.e., the voltage of the battery drops below lower deck, the battery charger 1010 is capable of decoupling the system power from the battery 1020 so that an adequate power supply is delivered to the system components in order for them to continue to operate and, hence, facilitating the instant-on feature.

The battery charger 1010 in FIG. 10 is constructed in accordance with the present teaching, disclosed herein with reference to FIGS. 2-9. While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A circuit for providing system power and charging a battery, comprising:
    a switching regulator configured for transmitting the system power based on an input power and a duty cycle;
    a duty cycle generator configured for generating the duty cycle to be used to regulate power output from the circuit in response to an input-current limit control circuit, a battery-current limit control circuit, and a battery-voltage limit control circuit;
    the input-current limit control circuit configured for limiting the duty cycle based on a limit of an input current;
    the battery-current limit control circuit configured for limiting the duty cycle based on a limit of a battery charging current;
    the battery-voltage limit control circuit configured for limiting the duty cycle based on a limit of a battery voltage;
    a controllable impedance element for nominally coupling the battery to the system; and
    an output voltage regulation circuit configured for controlling the controllable impedance element, the controllable impedance element partially or substantially decoupling the battery from the system in response to the voltage of the system dropping to or below a system voltage limit.

2. The circuit of claim 1, wherein the switching regulator is a step-down switching regulator.

3. The circuit of claim 1, wherein the input current limit control circuit comprises:
    a first current sense amplifier having its non-inverting input connected to the input power, its inverting input coupled to the switching regulator;
    a first resistor connecting the non-inverting and inverting inputs of the first current sense amplifier;
    a second resistor connecting output of the first current sense amplifier and the ground;
    a first amplifier having its inverting input connected to the output of the first current sense amplifier, its non-inverting input connected to a first voltage reference and its output connected to the duty cycle generator.

4. The circuit of claim 1, wherein the battery-current limit control circuit comprises:
    a second current sense amplifier having its non-inverting input connected to the system power and its inverting input connected to the controllable impedance element;
    a third resistor connecting the non-inverting and inverting inputs of the second current sense amplifier;
    a fourth resistor connecting the output of the second current sense amplifier and the ground;
    a second amplifier having its inverting input connected to the output of the second current sense amplifier, its non-inverting input connected to a second reference voltage, and its output coupled to the duty cycle generator to control the duty cycle generated.

5. The circuit of claim 1, wherein the battery-voltage limit control circuit comprises:
    a third amplifier having its output coupled to the duty cycle generator to control the duty cycle generated and its non-inverting input connected to a third reference voltage;
    a fifth resistor connected to an inverting input of the third amplifier and the battery; and
    a sixth resistor connecting the inverting input of the third amplifier and the ground.

6. The circuit of claim 4, wherein the controllable impedance element is implemented based on a first PMOS transistor.

7. The circuit of claim 6, wherein:
the first PMOS transistor having its source connected to the inverting input of the second current sense amplifier in the constant charge current amplifier, its drain connected to the battery, and its gate connected to an ideal diode amplifier; and
the output voltage regulation circuit comprises:
a first current source connected between the system power and the gate of the first PMOS transistor;
a first diode having its anode connected to the gate of the first PMOS transistor;
a fourth amplifier having its non-inverting input coupled to a fourth reference voltage and its output connected to the cathode of the first diode;
seventh and eighth resistors serially connected between the system power and the ground and where the seventh and eighth resistors are connected to each other being coupled to the inverting input of the fourth amplifier.

8. The circuit of claim 7, wherein the current source comprises at least a transistor or a resistor.

9. The circuit of claim 2, wherein the step-down switching regulator comprises:
a second PMOS transistor having its gate coupled to the duty cycle generator and its source coupled to the inverting input of the first current sense amplifier;
a first NMOS transistor having its gate coupled to the duty cycle generator, its source to the ground, and its drain to the drain of the second PMOS transistor; and
a sub-circuit coupled to the drain of the second PMOS transistor and the system power.

10. The circuit of claim 9, wherein the sub-circuit comprises:
an inductor having one end connected to the drain of the second PMOS transistor and the other end to the system power; and
a capacitor having one end connected to the system power and the other end connected to the ground.

11. The circuit of claim 1, further comprising an ideal diode amplifier.

12. The circuit of claim 11, wherein the ideal diode amplifier comprises:
a fifth amplifier having its non-inverting input coupled to the system power via a voltage reference and its inverting input connected to the battery; and
a second diode having its anode connected the anode of the first diode in the lower deck system and its cathode connected to the output of the fifth amplifier.

13. The circuit of claim 12, wherein the voltage reference is realized as an offset in the fifth amplifier.

14. A system for a portable device, comprising:
a plurality of system components configured to facilitate a plurality of functions that the portable device is designed to perform;
a battery configured for providing an internal power supply to the plurality of system components in the absence of an external input power supply; and
a battery charger configured for charging the battery when the external input power supply is available, wherein the battery charger is capable of supplying system power to the system components when voltage of the battery that is being charged is below a limit, thereby allowing the system components to operate when the voltage of the battery drops below the limit
wherein the battery charger comprises:
a switching regulator configured for transmitting the system power based on an input power and a duty cycle;
a duty cycle generator configured for generating the duty cycle to be used to regulate power output from the circuit in response to an input-current limit control circuit, a battery-current limit control circuit, and a battery-voltage limit control circuit;
the input-current limit control circuit configured for limiting the duty cycle based on a limit of an input current;
the battery-current limit control circuit configured for limiting the duty cycle based on a limit of a battery charging current;
the battery-voltage limit control circuit configured for limiting the duty cycle based on a limit of a battery voltage;
a controllable impedance element for nominally coupling the battery to the system; and
an output voltage regulation circuit configured for controlling the controllable impedance element, the controllable impedance element partially or substantially decoupling the battery from the system when the voltage of the system drops to or below a system voltage limit.

15. The apparatus of claim 14, wherein the plurality of system components comprises:
a display screen configured for displaying information;
one or more application modules deployed on the portable device and configured for performing at least some of the functions that the portable device is designed to perform;
a main circuit configured for executing at least some of the one or more application modules; and
one or more communication modules configured for facilitating the portable device to conduct communications.

* * * * *